(12) United States Patent
Tan et al.

(10) Patent No.: US 11,540,374 B1
(45) Date of Patent: Dec. 27, 2022

(54) INTEGRATED MULTIFUNCTIONAL DRIVE POWER SUPPLY FOR LED LAMP

(71) Applicant: Shenzhen Haixing Technology Co., Ltd., Guangdong (CN)

(72) Inventors: Huishi Tan, Guangdong (CN); Zheng Peng, Guangdong (CN)

(73) Assignee: Shenzhen Haixing Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/565,466

(22) Filed: Dec. 30, 2021

(30) Foreign Application Priority Data

Oct. 26, 2021 (CN) .......................... 202111259410.4

(51) Int. Cl.
| | |
|---|---|
| *H05B 45/37* | (2020.01) |
| *F21V 23/00* | (2015.01) |
| *H05B 45/3577* | (2020.01) |
| *H05B 45/3725* | (2020.01) |
| *H05B 45/28* | (2020.01) |
| *F21V 1/14* | (2006.01) |
| *F21V 31/00* | (2006.01) |
| *F21Y 115/10* | (2016.01) |

(52) U.S. Cl.
CPC ......... *H05B 45/3725* (2020.01); *F21V 1/143* (2013.01); *F21V 23/009* (2013.01); *F21V 31/00* (2013.01); *H05B 45/28* (2020.01); *H05B 45/3577* (2020.01); *F21Y 2115/10* (2016.08)

(58) Field of Classification Search
None
See application file for complete search history.

(56) References Cited

U.S. PATENT DOCUMENTS 9,101,027 B2 * 8/2015 Donegan .............. H05B 47/115
9,622,314 B1 * 4/2017 Li .......................... F21V 1/143

* cited by examiner

*Primary Examiner* — Dedei K Hammond

(57) ABSTRACT

Disclosed is an integrated multifunctional drive power supply for an LED lamp, including a drive power supply housing in which a main control panel is arranged and includes a drive power supply module, a dimming module, and a color temperature regulation module, wherein an MCU processor is arranged in the drive power supply module; a dimming signal interface of the dimming module is connected with a dimming port of the drive power supply module; a dimming signal output end of the dimming module is connected with a dimming power signal input end of the LED lamp; a color temperature regulation signal interface of the color temperature regulation module is connected with an LED output port of the drive power supply module; and a color temperature signal output end of the color temperature regulation module is connected with a color temperature regulation signal receiving end of the LED lamp.

13 Claims, 5 Drawing Sheets

INTEGRATED MULTIFUNCTIONAL DRIVE POWER SUPPLY FOR LED LAMP

CROSS REFERENCE TO RELATED APPLICATIONS

The present application claims the benefit of Chinese Patent Application No. 202111259410.4 filed on Oct. 26, 2021, the contents of which are incorporated herein by reference in their entirety.

FIELD

The present disclosure relates to the technical field of lamp control, in particular to an integrated multifunctional drive power supply for an LED lamp.

BACKGROUND

At present, lamps with control systems have been widely used in various industries. Existing lamps in use include power supply drive control lamps, dimming and color temperature regulation control lamps, and sensing controller lamps. However, various control components of the existing lamps are all in separate control structures, which cannot be integrated and compatible for use. Therefore, when various control functions need to be met, a lamp needs to be provided with various control components to make the installation cumbersome, and there are disadvantages such as unmatched interfaces, which greatly affects the convenience of use.

Therefore, the prior art has defects and needs to be improved.

SUMMARY

A main objective of the present disclosure is to provide an integrated multifunctional drive power supply for an LED lamp, which aims to improve the structure of an existing drive power supply of a lamp, organically integrally combines power supply drive control, sensing control, and dimming and color temperature regulation control, and is convenient to use.

In order to achieve the above objective, the integrated multifunctional drive power supply for the LED lamp provided by the present disclosure includes a drive power supply housing, wherein a main control panel is arranged in the drive power supply housing; the main control panel includes a drive power supply module used to supply power to the LED lamp, a dimming module used to dim the LED lamp, and a color temperature regulation module used to perform color temperature regulation on the LED lamp; an MCU processor used for signal processing is arranged in the drive power supply module; a dimming signal interface of the dimming module is connected with a dimming port of the drive power supply module; a dimming signal output end of the dimming module is connected with a dimming power signal input end of the LED lamp; a color temperature regulation signal interface of the color temperature regulation module is connected with an LED output port of the drive power supply module; and a color temperature signal output end of the color temperature regulation module is connected with a color temperature regulation signal receiving end of the LED lamp.

Preferably, the dimming module includes a dimming toggle switch; the dimming toggle switch includes three dimming positions with different powers; the color temperature regulation module includes a color temperature regulation toggle switch; and the color temperature regulation toggle switch includes a warm light position, a natural light position, and a cold light position.

Preferably, the drive power supply housing includes a bottom shell and a cover plate; the main control panel is installed in the bottom shell; the cover plate or a side surface of the bottom shell is provided with openings respectively corresponding to the dimming toggle switch and the color temperature regulation toggle switch; waterproof silica gel plugs are installed in the openings; the drive power supply housing further includes a wire clamp for fixing an input/output wire of the main control panel; and the side surface of the bottom shell is further provided with a clamping slot for installing the wire clamp.

Preferably, a controller for sensing or a waterproof cap is further detachably installed on the cover plate; a control panel is installed inside the controller; a connection probe used to be electrically connected with the main control panel is arranged on the control panel; a connection contact corresponding to the connection probe is arranged on the main control panel; and avoidance holes used to allow the probe to pass are formed in the controller and the cover plate.

Preferably, the controller or the waterproof cap is connected with the cover plate through a thread structure.

Preferably, the controller includes a microwave sensor or an infrared sensor or an ambient light sensor.

Preferably, the controller includes an upper cover and a lower cover which are connected with each other, and the control panel is arranged in the upper cover and the lower cover.

Preferably, waterproof sealing rings are respectively abutted between the bottom shell and the cover plate, between the upper cover and the lower cover, and between the controller and the cover plate.

Compared with the prior art, the integrated multifunctional drive power supply has the beneficial effects that the structure of an existing LED lamp control base is improved; the power supply drive control, the dimming and color temperature regulation control, and the sensing control are organically combined, wherein the power supply drive control and the dimming and color temperature regulation control are integrated on one main control panel and are installed in the drive power supply housing, and the controller used for sensing control is detachably installed on the drive power supply housing, which can be selectively installed according to an actual use need; furthermore, the controller and the main control panel are connected in a connection way realized by a probe and a contact; the structural design is simple; the convenience of use is improved; and the cost is reduced.

BRIEF DESCRIPTION OF THE DRAWINGS

To describe the embodiments of the present disclosure or the technical solutions in the prior art more clearly, accompanying drawings required to be used in the embodiments or the description of the prior art will be briefly introduced below. Obviously, the accompanying drawings in the description below are only some embodiments of the present disclosure. Those of ordinary skill in the art also can acquire other accompanying drawings according to structures shown in these accompanying drawings without doing creative work.

The achievement of objectives, function features, and advantages of the present disclosure will be further described in combination with embodiments and with reference to the accompanying drawings.

DETAILED DESCRIPTION OF THE EMBODIMENTS

An embodiment provides an integrated multifunctional drive power supply for an LED lamp, including a drive power supply housing, wherein a main control panel 1 is arranged in the drive power supply housing; the main control panel 1 includes a drive power supply module used to supply power to the LED lamp, a dimming module used to dim the LED lamp, and a color temperature regulation module used to perform color temperature regulation on the LED lamp; an MCU processor used for signal processing is arranged in the drive power supply module; a dimming signal interface of the dimming module is connected with a dimming port of the drive power supply module; a dimming signal output end of the dimming module is connected with a dimming power signal input end of the LED lamp; a color temperature regulation signal interface of the color temperature regulation module is connected with an LED output port of the drive power supply module; and a color temperature signal output end of the color temperature regulation module is connected with a color temperature regulation signal receiving end of the LED lamp.

Further, the dimming module includes a dimming toggle switch 2; the dimming toggle switch 2 includes three dimming positions with different powers; the color temperature regulation module includes a color temperature regulation toggle switch 3; and the color temperature regulation toggle switch 3 includes a warm light position, a natural light position, and a cold light position.

Figure 2:
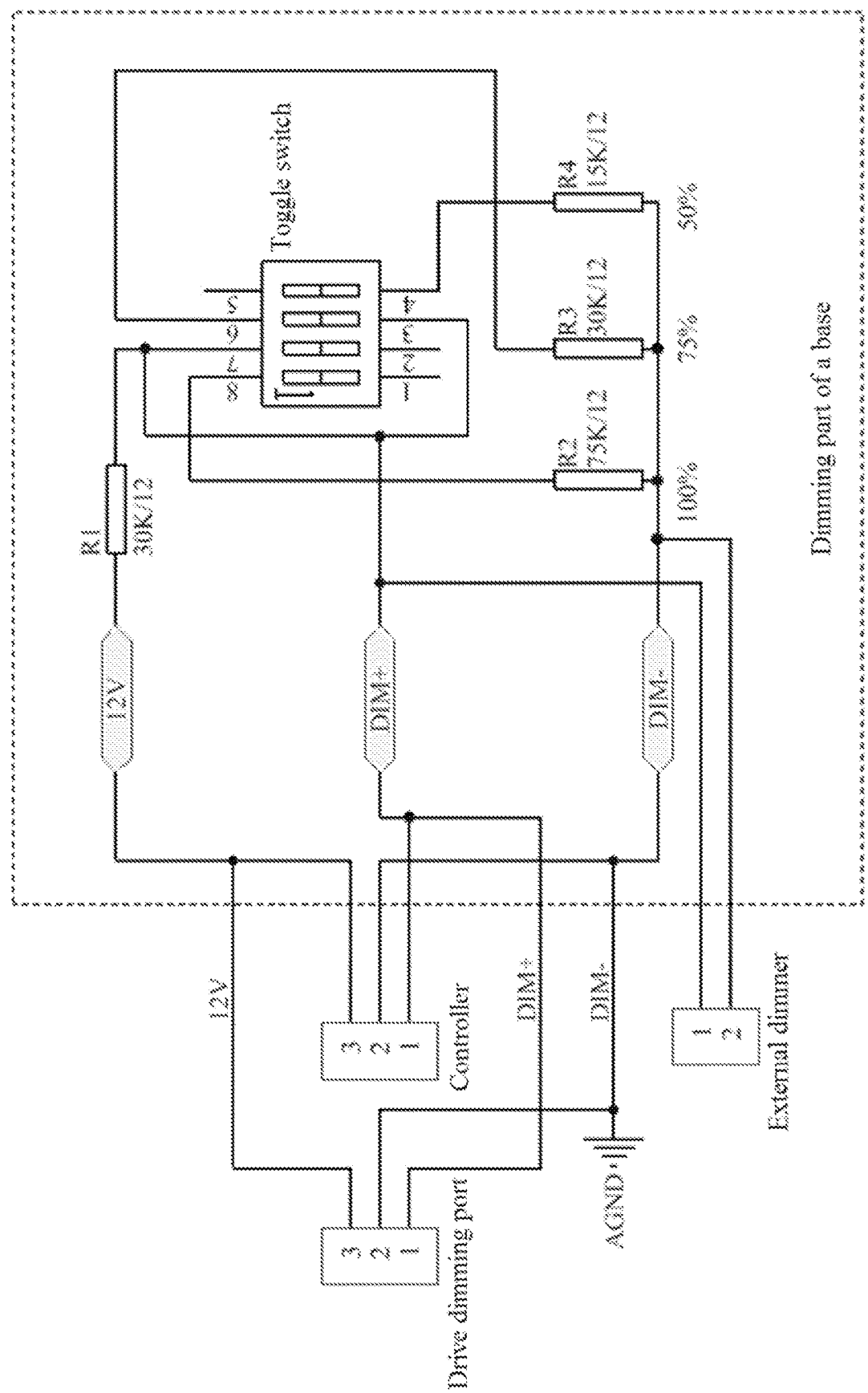
FIG. 2 is a schematic diagram of circuit connection of a dimming module of the present disclosure.

Referring to FIG. 2, the dimming signal interface of the dimming module is connected with the dimming port of the drive power supply module; an interface end of the controller is reserved on the main control panel 1 and is used to be externally connected with the controller for sensing; an external active dimmer interface is further reserved, and may be connected with an external wall-mounted active dimmer to directly regulate the power of the LED lamp and regulate desired lamp brightness.

Figure 3:
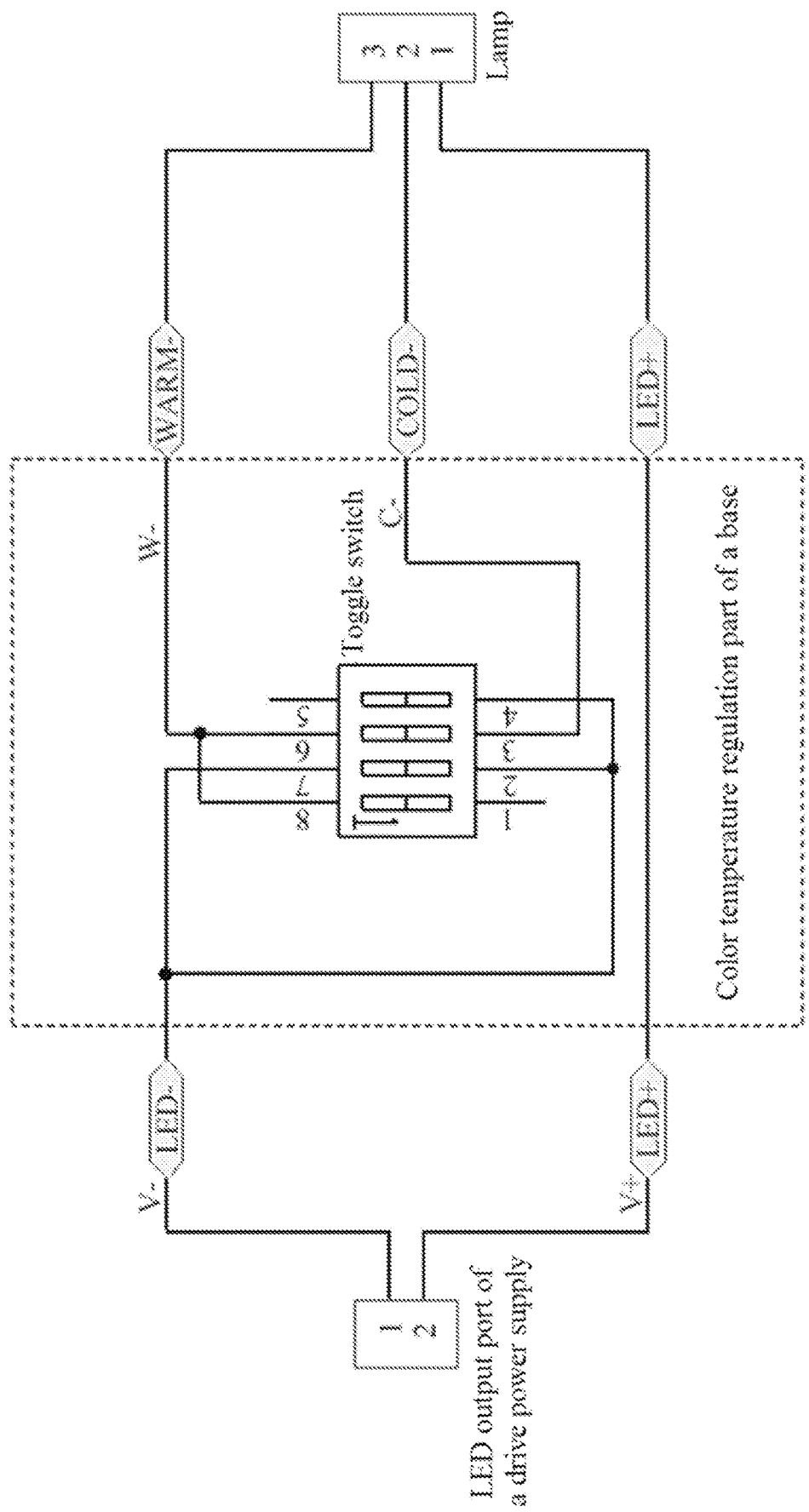
FIG. 3 is a schematic diagram of circuit connection of a color temperature regulation module of the present disclosure.

Referring to FIG. 3, the color temperature regulation signal interface of the color temperature regulation module is connected with the LED output port of the drive power supply module; changeover of three groups of switches is realized through the color temperature regulation toggle switch 3, and is output to two paths of LEDs (warm light beads and cold light beads) of the LED lamp to realize changeover of three color temperatures: warm light, natural light, and cold light.

Figure 4:
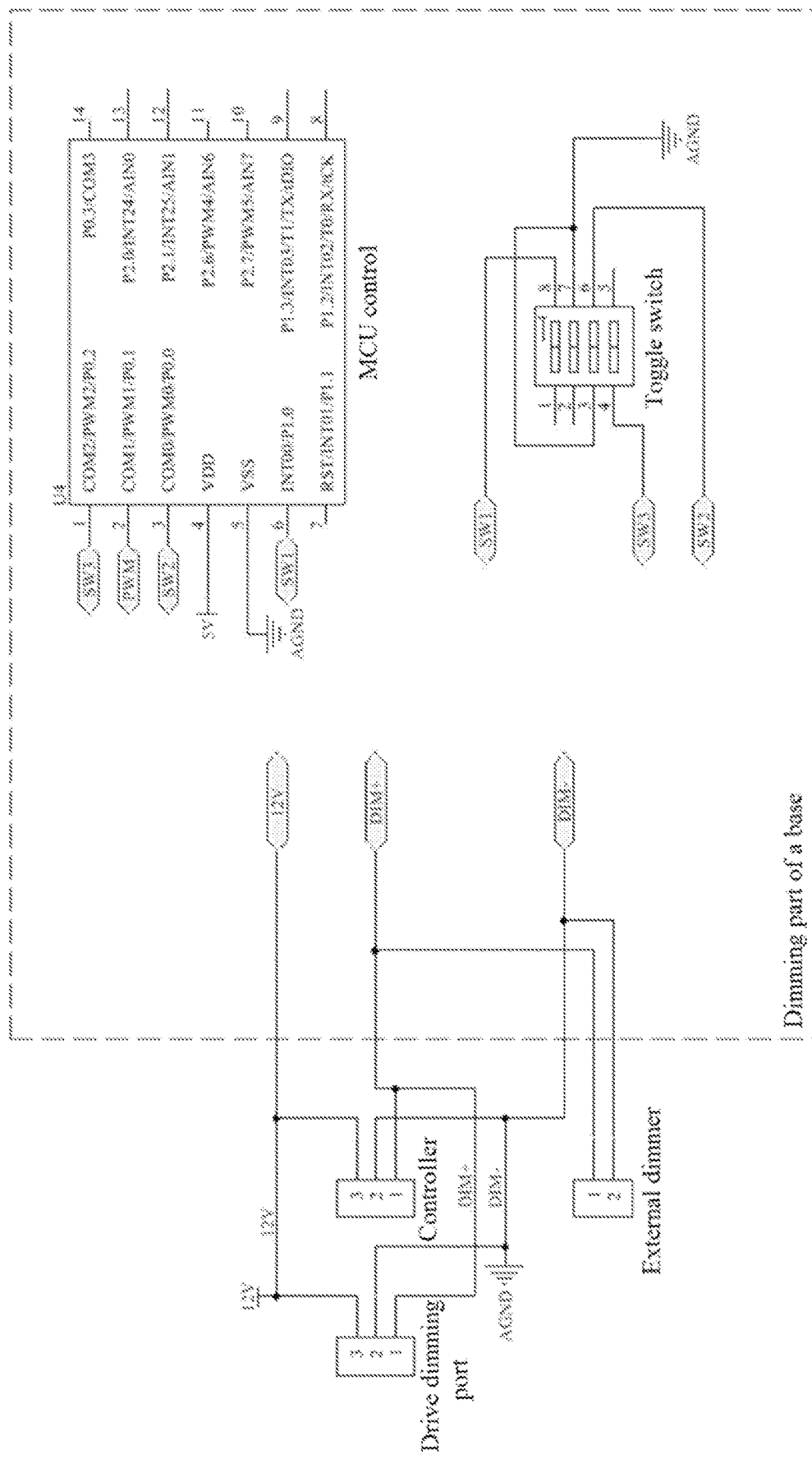
FIG. 4 is a schematic diagram of a circuit structure of a color temperature regulation module controlled by an MCU processor of the present disclosure.
Figure 5:
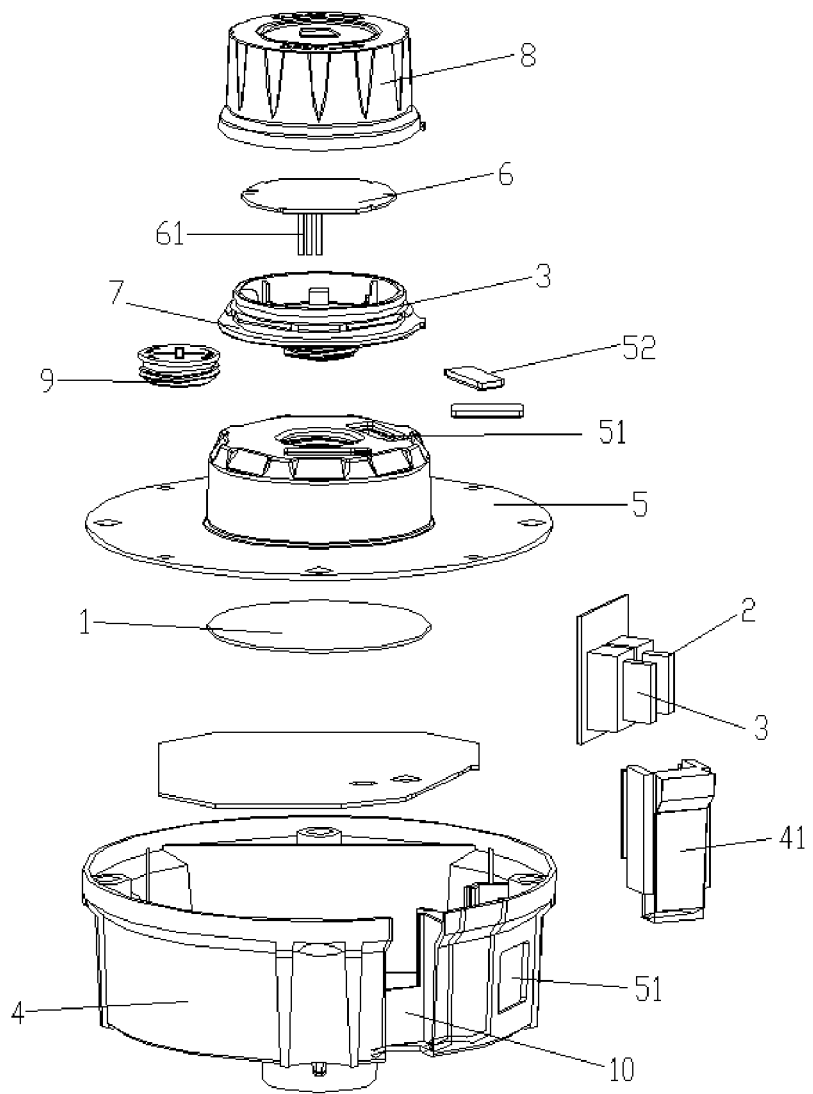
FIG. 5 is an exploded view illustrating that a toggle switch is arranged on a side surface of a bottom shell in the present disclosure.

Referring to FIG. 4, when a controller is present outside the main control panel 1, the controller sends a sensing signal to the drive power supply module by means of sensing a condition of an external environment, such as brightness of ambient light and whether there is a person in the environment, and the MCU processor in the controller regulates, according to the sensing signal, the power of the LED lamp and controls the power of the LED lamp, thus regulating the brightness and the color temperature of the LED lamp.

Figure 1:
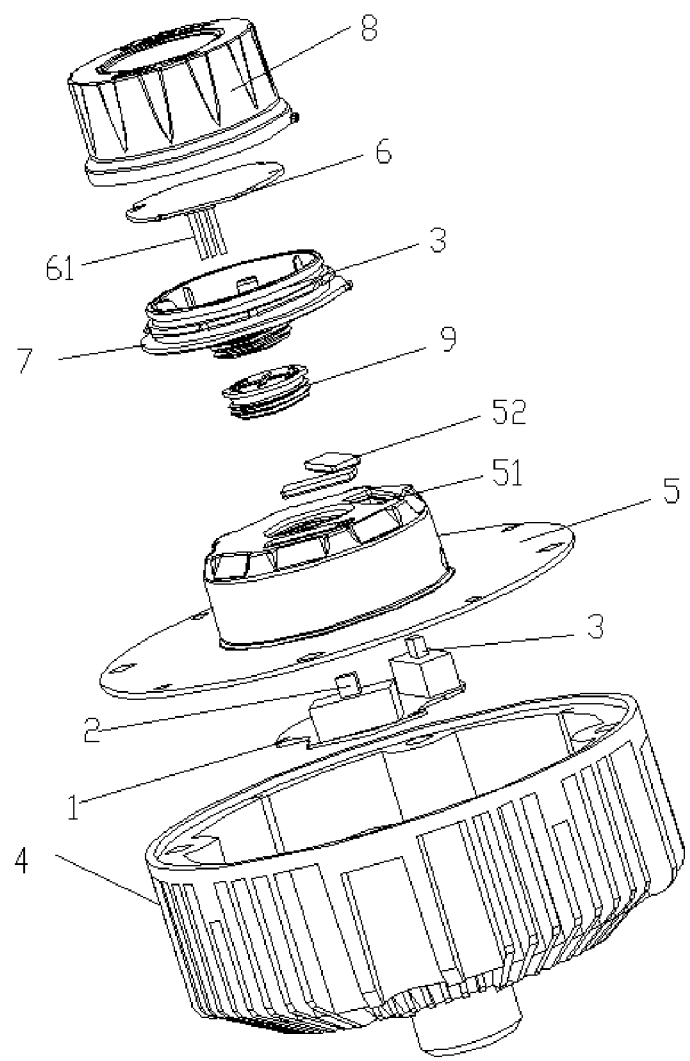
FIG. 1 is an exploded view of an integrated control base of the present disclosure.

Further, referring to FIG. 1, the drive power supply housing includes a bottom shell 4 and a cover plate 5. The main control panel 1 is installed in the bottom shell 4; the cover plate 5 or a side surface of the bottom shell 4 is provided with openings 51 respectively corresponding to the dimming toggle switch 2 and the color temperature regulation toggle switch 3; and waterproof silica gel plugs 52 are installed in the openings 51. By means of regulating the positions of the toggle switch, the brightness and the color temperature of the LED lamp are regulated; and the added waterproof silica gel plugs 52 can effectively improve the waterproof performance of the drive power supply housing. The dimming and color temperature regulation control of the LED lamp is integrated in the main control panel 1 of the drive power supply, which is convenient for use by users and overcomes the defect that existing drive power supply and dimming and color temperature regulation control are independent of each other, so compatible installation and wiring connection are required. The drive power supply housing further includes a wire clamp 10 for fixing an input/output wire of the main control panel 1; and the side surface of the bottom shell 4 is further provided with a clamping slot 41 for installing the wire clamp.

Further, a controller for sensing or a waterproof cap 9 is further detachably installed on the cover plate 5; a control panel 6 is installed inside the controller; a connection probe 61 used to be electrically connected with the main control panel 1 is arranged on the control panel 6; a connection contact corresponding to the connection probe 61 is arranged on the main control panel 1; and avoidance holes used to allow the probe to pass are formed in the controller and the cover plate 5. The controller and the drive power supply are detachably connected with each other and are abutted through the connection probe 61 and the connection contact, which facilitates controller installation and circuit connection; furthermore, the controller is conveniently combined with the drive power supply and the dimming and color temperature regulation control integrally, which meets a demand of users for diversity and avoids the defects that three control methods for the traditional lamp are independent of one another, resulting in complicated wiring and incompatible structural installation. When the controller does not need to be used, the controller is screwed off, and the waterproof cap 9 is installed instead. The operation is simple and convenient.

Further, the controller or the waterproof cap 9 is connected with the cover plate 5 through a thread structure, which ensures the stability and the waterproof performance of the installation structure and facilitates operation at the same time.

Further, the controller includes a microwave sensor or an infrared sensor or an ambient light sensor to meet the demand of the user for diversity, and may be selected and installed according to an actual need.

Further, the controller includes an upper cover 7 and a lower cover 8 which are connected with each other, and the control panel 6 is arranged in the upper cover 7 and the lower cover 8. Waterproof sealing rings are respectively abutted between the bottom shell 4 and the cover plate 5, between the upper cover 7 and the lower cover 8, and between the controller and the cover plate 5. Therefore, the sealing waterproof performance of the installation of the overall structure is ensured and the service life of the control base is prolonged.

The above descriptions are only the preferred embodiments of the present disclosure, and are not intended to limit the scope of the present disclosure. Any equivalent structure or equivalent process transformation made by using the contents of the description and the accompanying drawings of the present disclosure and directly or indirectly applied to other related technical fields shall all be similarly included in the scope of patent protection of the present disclosure.

What is claimed is:

1. An integrated multifunctional drive power supply for an LED lamp, comprising a drive power supply housing, wherein a main control panel is arranged in the drive power supply housing; the main control panel comprises a drive power supply module used to supply power to the LED lamp, a dimming module used to dim the LED lamp, and a color temperature regulation module used to perform color temperature regulation on the LED lamp; an MCU processor used for signal processing is arranged in the drive power supply module; a dimming signal interface of the dimming module is connected with a dimming port of the drive power supply module; a dimming signal output end of the dimming module is connected with a dimming power signal input end of the LED lamp; a color temperature regulation signal interface of the color temperature regulation module is connected with an LED output port of the drive power supply module; and a color temperature signal output end of the color temperature regulation module is connected with a color temperature regulation signal receiving end of the LED lamp.

2. The integrated multifunctional drive power supply for the LED lamp according to claim 1, wherein the dimming module comprises a dimming toggle switch; the dimming toggle switch comprises three dimming positions with different powers; the color temperature regulation module comprises a color temperature regulation toggle switch; and the color temperature regulation toggle switch comprises a warm light position, a natural light position, and a cold light position.

3. The integrated multifunctional drive power supply for the LED lamp according to claim 2, wherein the drive power supply housing comprises a bottom shell and a cover plate; the main control panel is installed in the bottom shell; the cover plate or a side surface of the bottom shell is provided with openings respectively corresponding to the dimming toggle switch and the color temperature regulation toggle switch; waterproof silica gel plugs are installed in the openings; the drive power supply housing further comprises a wire clamp for fixing an input/output wire of the main control panel; and the side surface of the bottom shell is further provided with a clamping slot for installing the wire clamp.

4. The integrated multifunctional drive power supply for the LED lamp according to claim 3, wherein a controller for sensing or a waterproof cap is further detachably installed on the cover plate; a control panel is installed inside the controller; a connection probe used to be electrically connected with the main control panel is arranged on the control panel; a connection contact corresponding to the connection probe is arranged on the main control panel; and avoidance holes used to allow the probe to pass are formed in the controller and the cover plate.

5. The integrated multifunctional drive power supply for the LED lamp according to claim 3, wherein a controller for sensing or a waterproof cap is further detachably installed on the cover plate; a control panel is installed inside the controller; an earphone plug used to be electrically connected with the main control panel is arranged on the control panel; an earphone socket corresponding to the earphone plug is arranged on the main control panel; and avoidance holes used to allow the earphone plug to pass are formed in the controller and the cover plate.

6. The integrated multifunctional drive power supply for the LED lamp according to claim 4, wherein the controller or the waterproof cap is connected with the cover plate through a thread structure.

7. The integrated multifunctional drive power supply for the LED lamp according to claim 5, wherein the controller or the waterproof cap is connected with the cover plate through a thread structure.

8. The integrated multifunctional drive power supply for the LED lamp according to claim 4, wherein the controller comprises one of or a combination of at least two of a microwave sensor, a PIR sensor, an ambient light sensor, a Bluetooth controller, or a Zigbee controller.

9. The integrated multifunctional drive power supply for the LED lamp according to claim 5, wherein the controller comprises one of or a combination of at least two of a microwave sensor, a PIR sensor, an ambient light sensor, a Bluetooth controller, or a Zigbee controller.

10. The integrated multifunctional drive power supply for the LED lamp according to claim 4, wherein the controller comprises an upper cover and a lower cover which are connected with each other, and the control panel is arranged in the upper cover and the lower cover.

11. The integrated multifunctional drive power supply for the LED lamp according to claim 5, wherein the controller comprises an upper cover and a lower cover which are connected with each other, and the control panel is arranged in the upper cover and the lower cover.

12. The integrated multifunctional drive power supply for the LED lamp according to claim 10, wherein waterproof sealing rings are respectively abutted between the bottom shell and the cover plate, between the upper cover and the lower cover, and between the controller and the cover plate.

13. The integrated multifunctional drive power supply for the LED lamp according to claim 11, wherein waterproof sealing rings are respectively abutted between the bottom shell and the cover plate, between the upper cover and the lower cover, and between the controller and the cover plate.

* * * * *